No. 889,433.
PATENTED JUNE 2, 1908.
W. A. BREWSTER.
GRAIN SEPARATOR.
APPLICATION FILED MAY 13, 1907.
3 SHEETS—SHEET 3.
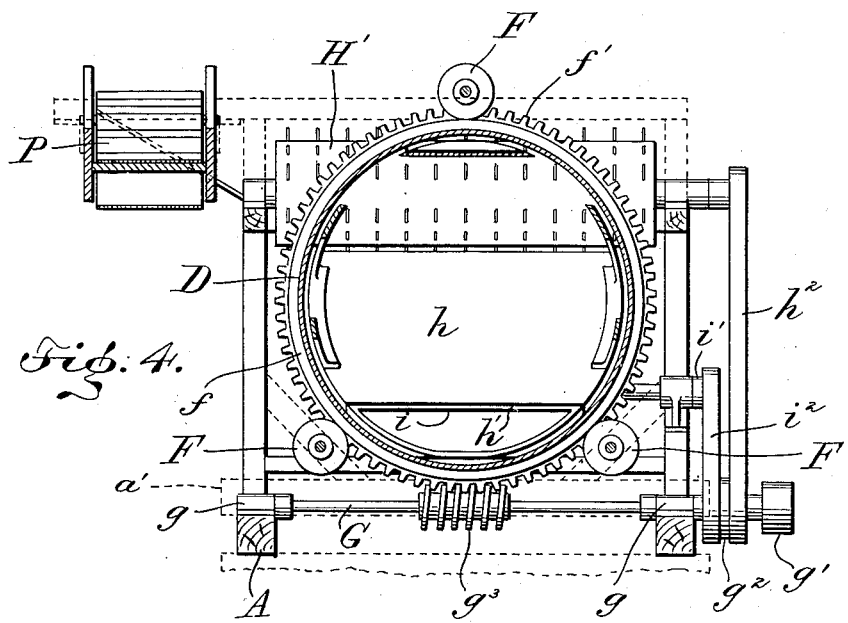
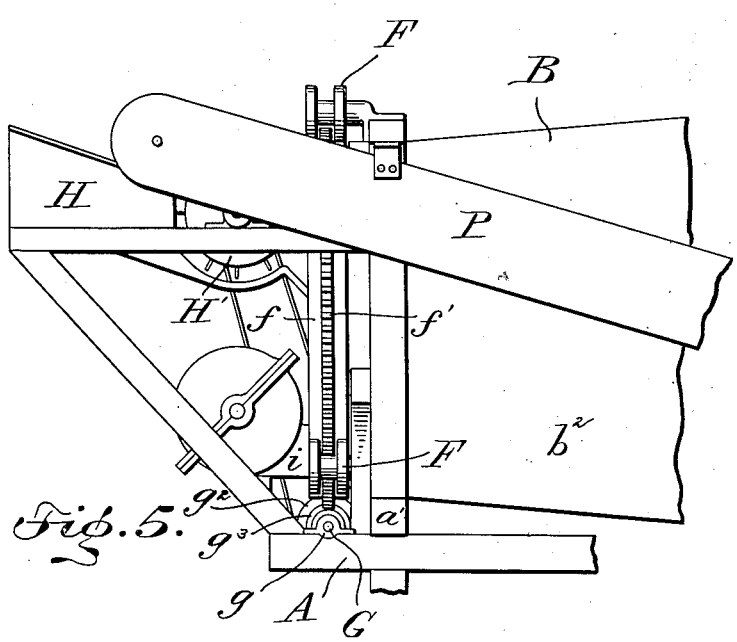
WITNESSES
INVENTOR
William A. Brewster
BY
ATTORNEYS

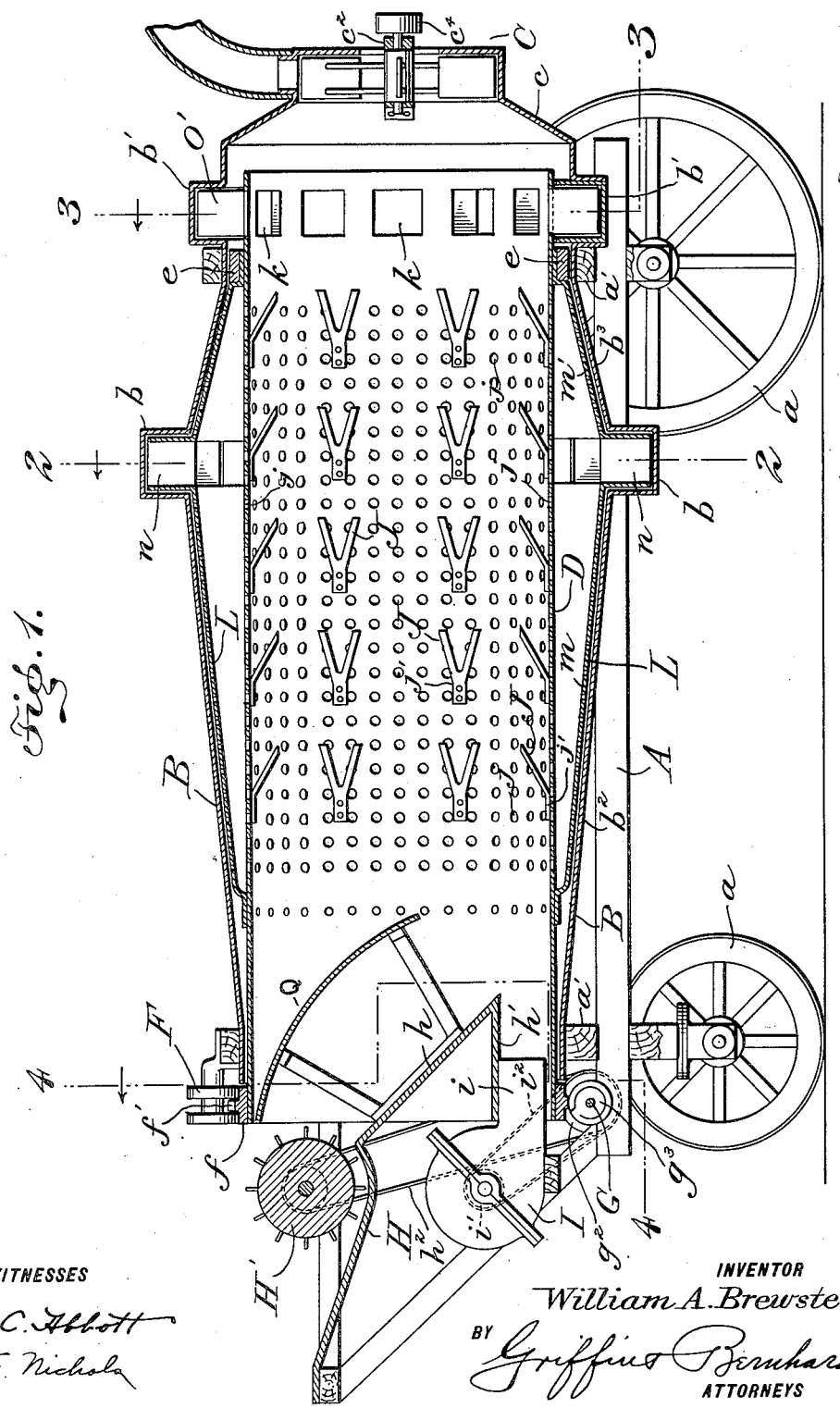

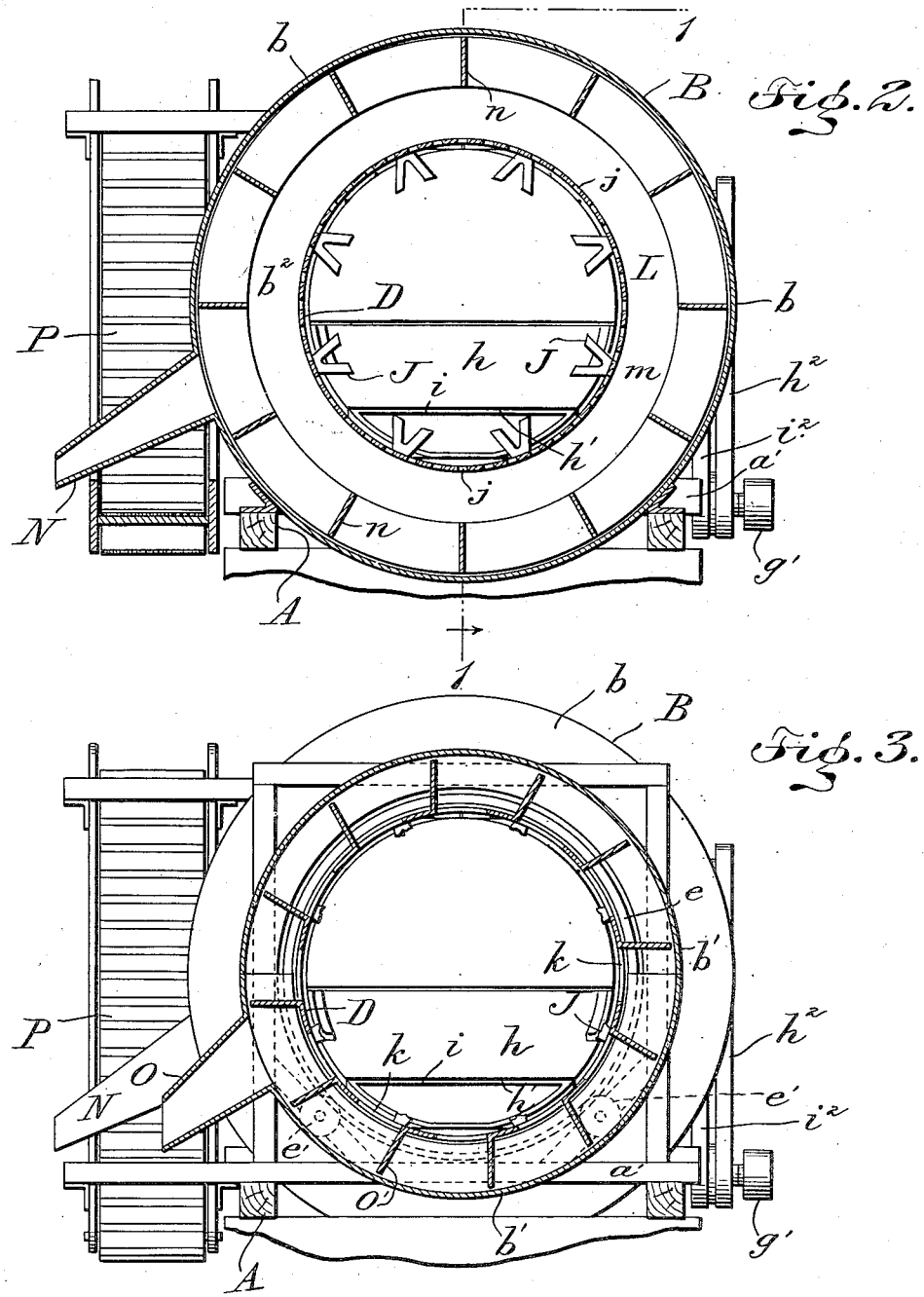

UNITED STATES PATENT OFFICE.

WILLIAM A. BREWSTER, OF EDMONTON, ALBERTA, CANADA.

GRAIN-SEPARATOR.

No. 889,433.  Specification of Letters Patent.  Patented June 2, 1908.

Application filed May 13, 1907. Serial No. 373,341.

*To all whom it may concern:*

Be it known that I, WILLIAM A. BREWSTER, a subject of the King of Great Britain, residing at Edmonton, in the Province of Alberta and Dominion of Canada, have invented certain new and useful Grain-Separators, of which the following is a specification.

My invention is a grain separator wherein mechanisms are employed for carrying on continuously and automatically the operations of threshing the grain from the straw, carrying the threshed grain through the machine in a manner to subject the matter to agitation while winnowing or blowing the chaff and straw from the grain, separating the good grain from the foul seeds and dust, and returning the tailings back to the cylinder. In my machine these operations are carried on without the employment of cumbrous and heavy straw carriers or rakes, so commonly used in many styles of grain separators.

One of the leading features of the new machine is a longitudinal rotary cylinder perforated for the escape of grain and provided with agitators for the straw and chaff, so arranged that the latter are prevented from lodging upon the cylinder, thus overcoming the tendency of the straw and chaff to clog the grain-exit openings in the cylinder, combined with mechanisms for producing a blast and a suction of air through said rotatable cylinder, whereby the chaff is winnowed out of the grain, and the straw and chaff are carried through, and discharged from, the machine.

The machine embraces, also, novel means for collecting the grain and discharging the same automatically to a spout for bagging the grain; furthermore, in means for collecting the tailings and returning them to the threshing mechanism, and finally in a novel construction and combination of parts and devices whereby simplicity of construction is secured, the parts are rendered efficient and reliable in operation, and the cost of manufacture is reduced.

In the accompanying drawings, I have illustrated one practical embodiment of the invention, but the construction shown therein is to be understood as illustrative only, and not as defining the limits of the invention.

Figure 1 is a vertical longitudinal section on the line 1—1 of Fig. 2. Figs. 2, 3, and 4 are vertical cross sections on the lines 2—2, 3—3, and 4—4, respectively, of Fig. 1. Fig. 5 is a detail view, in side elevation, of a part of the machine illustrating the elevator for returning the tailings to the threshing mechanism and showing, also, the means for rotatably supporting the front portion of the cylinder, and for driving said cylinder.

The various working parts of the machine are mounted on a suitable frame, A, which is supported by suitable carrying wheels, $a$.

The frame is provided with bolsters, $a'$, at the front and rear thereof, and on these bolsters there is secured a stationary casing, B. Said casing is substantially air tight throughout its length, and it is composed, preferably, of sheet metal in the form shown by the drawings. At a point intermediate of its length, the casing is provided with an annular grain trough, $b$, and at its rear portion said casing is provided with an annular tailings trough, $b'$. The casing is open at its front end, and the portion, $b^2$, of the casing inclines or slopes from said open front end to the grain trough, $b$, whereas the other portion, $b^3$, of the casing is inclined from the tailings trough, $b'$, to the grain trough, $b$, the inclination of said portion, $b^3$, of the casing being opposite to the portion, $b^2$, and at a greater angle than said portion, $b^2$. The rear part of the stationary casing, B, is closed by a hood, $c$, which is formed at its central part with a casing, $c^5$, for the reception of a suction fan, C. The hood, $c$, communicates directly with the rear part of the casing B, and a slotted rear part of the screen cylinder, D, extends into said hood. The fan casing, $c^5$, is concentric with the screen cylinder, D, so that the axis of the fan, C, is substantially coincident with the axis of rotation of the screen cylinder, D, whereby the fan, C, is adapted to draw the straw and refuse directly from the screen cylinder, D. The shaft, $c'$, of the fan, C, is journaled in suitable bearings, $c^2$, in the casing, $c^5$, and said fan shaft, $c'$, is provided with suitable means for driving the fan, such as a pulley, $c^4$.

D designates a horizontal cylinder which extends lengthwise of the machine, said cylinder extending entirely through the casing, B, and being rotatable therein. This cylinder, D, is perforated for about two-thirds of its length, to permit the threshed grain to escape therefrom into the casing B, but the front part of the cylinder is imperforate, as shown in Fig. 1, in order to keep the grain in the cylinder when the straw etc. is delivered thereto from the threshing cylinder and concave. Said rotatable cylinder is open at its front and rear ends, as shown.

Suitable means are provided for mounting the cylinder, D, for rotation freely on its longitudinal axis. Near its rear part, the cylinder, D, is provided with an external ring, e, adapted to furnish a track for engagement with friction rollers, e', shown in dotted lines in Fig. 3, said friction rollers being suitably supported within the stationary casing, B, and operating to sustain the weight of the rear part of the cylinder, D. The front part of the cylinder extends beyond the corresponding front end of the stationary casing, and to said exposed front end of the cylinder is secured a band, f, which is provided centrally with a row of teeth forming a gear, f', (see Figs. 1, 4, and 5,) said band being provided on opposite sides of the gear, f', with two plain surfaces, the latter furnishing a track for engagement by the friction rollers, F. Said friction rollers, F, are suitably mounted on the stationary casing, B, for engagement with the smooth surfaces of the band, f, and as shown in Fig. 1, it is preferred to use grooved rollers, F, adapted to straddle the toothed portion, f', of the band, f, whereby the rollers not only support the front part of the rotatable cylinder, D, but they also tend to prevent said cylinder from having endwise displacement or movement within the stationary casing, B.

G designates a driving shaft arranged in a horizontal position across the front part of the machine frame, said shaft being journaled in appropriate bearings g. Said shaft is provided with a driving pulley, g', with other pulleys, g², for a purpose to be explained, and with a worm, g³, the latter meshing with the gear, f', and operating to drive the cylinder, D, whereby the cylinder is rotated on its longitudinal axis within the stationary casing, B.

The separator is provided with a threshing mechanism of any suitable or preferred construction, and in the drawings I have shown one form of threshing mechanism consisting of a concave, H, and a toothed cylinder, H'. The concave is supported adjacent to the open front end of the cylinder, D, and from said concave extends an inclined board, h, which is joined at its lower end by a horizontal wind board, h'. The cylinder, H', has its shaft mounted in suitable bearings on the frame, A, and said cylinder is driven by a belt, h², from an engine, or from any other convenient source of power.

At the front part of the machine there is provided an ordinary blast fan, the casing, I, of which is provided with a wind trunk, i, which extends below the wind board, b'. The fan shaft has a pulley, i', which is driven by a belt, i², from one of the pulleys, g², of the shaft, G.

It will be observed that the grain separator is provided with two fans, the fan at the front of the machine operating to blow air into the cylinder, D, while the fan, C, at the rear of the machine exhausts the air from said cylinder, D.

The cylinder, D, is composed, preferably, of metal, and for about two-thirds of its length said cylinder is provided with annular rows of perforations, j, said perforations permitting the grain and foul seeds to escape from said cylinder in the operation of separating the straw and chaff from the grain.

It is important in the operation of my machine to prevent the straw and chaff from lodging upon the inner surface of the rotatable cylinder, for the purpose of keeping said straw and chaff in a light separated condition, and to permit the grain and seeds to pass through the perforations, j, of said cylinder. The means which I prefer to employ for accomplishing these results consists of agitators, J, in the form of forks, each agitator being provided with a shank, j', adapted to be riveted or otherwise fastened to the inner surface of the cylinder, D. The forks are spaced, and arranged in rows within the cylinder, said rows of forks extending lengthwise of the cylinder and also extending annularly with respect thereto, as shown in Fig. 1. Any desired number of forks may be employed, and to facilitate the passage of the straw and chaff through the machine, said forks, J, are inclined rearwardly with respect to the cylinder, such inclination being in the direction of the feed of the straw and chaff through said cylinder.

In addition to the perforations, j, the cylinder D, is provided at its rear part with slots, k, the latter being formed in said cylinder opposite to the tailings trough b', said slots constituting outlets for the tailings and other refuse matter. It may be stated that the straw and chaff are caused to move longitudinally through the cylinder, while the latter is rotated, by the circulation of air which is established in the cylinder by the operation of the blast, fan, I, and the suction fan, C. The agitators, J, operate to separate the straw or loosen it up, so that the air blast winnows the chaff from the grain, and the straw and chaff are exhausted from the cylinder, D, by the suction of the fan, C.

L is a screen arranged between the stationary casing, B, and the rotatable cylinder, D. This screen consists of two perforated members, m, m', which are arranged externally to the cylinder, D. The members, m, m', of the screen are conical, and they are unequal in length, said members converging toward the grain trough, b, of the casing, B. The long member, m, of the said screen is fastened at its front portion to the cylinder, D, while the short member, m', is attached at its rear portion to said cylinder, whereby the two screen members are rotatable with the cylinder, and said screen members are adapted to direct the grain toward and into the trough, b. The perforations of the screen members are of such size as to retain the grain on the screens, but the foul seeds and dust are free to pass through said perforations and to lodge upon the casing, B, from whence the dust and foul seeds may be discharged in any appropriate manner.

The grain which is collected in the trough, b, is adapted to be discharged by a spout, N, to a suitable bagging mechanism or to other receptacles. Said spout is shown in Fig. 2 as extending downwardly from the annular trough, b, at a point some distance above the bottom thereof, and in order to lift the grain from the bottom portion of the trough into the spout, N, the rotatable cylinder, D, is provided with wings, n, see Fig. 2. The wings are fastened externally to said cylinder, D, and they sweep in the annular trough, b, whereby the wings lift the grain up to the spout, N, from whence the grain is discharged into a suitable receptacle, such as a bag, (not shown).

The tailings which are carried through the cylinder, D, and which are discharged therefrom through the radial slots, K, are adapted to collect in the annular trough, b', at the rear part of the machine. The tailings are expelled from the trough and into a spout, O, upon the tailings elevator, P, the latter being arranged in an inclined position, at one side of the machine, and extending upwardly from the rear part of said machine to the threshing mechanism, at the front end of said machine. The spout, O, is above the bottom of the tailings trough, b', and in order to elevate the tailings into said spout, O, a number of radial wings, O', are fastened to the cylinder, D, at the rear part thereof. Said wings, O', extend from the cylinder so as to sweep in the annular trough, b', and said wings are arranged in alternate order to the exhaust slots, k, as shown in Fig. 3. It is evident that the tailings which are deposited in the trough, b', will be carried by the wings, O', up to the spout, O, from whence the tailings pass to the elevator, P, the latter operating to carry the tailings to the threshing mechanism, whereby the tailings are subjected to a second threshing operation. The tailings elevator, P, is adapted to be driven by any suitable gearing (not shown), the latter being operated from or by the driving shaft, G.

The operation of the machine may be described as follows: The cylinder, D, is driven by the shaft, G, the latter operating to also drive the fan, I, and the threshing cylinder. Suitable means should be provided, also, for operating the exhaust fan, C, and the tailings elevator, P. The grain is fed into the threshing mechanism, from whence the grain and straw pass down the inclined board into the cylinder, D. The straw is caught by the forks, J, which, in their rotation with the cylinder, operate to loosen the straw and thus assist in the separation of the grain therefrom. The grain and foul seeds escape by the perforations, j, from the cylinder, D, while the straw and chaff are carried through the cylinder by the circulation of air established by the operations of the blast fan and the suction fan. The grain and foul seeds are caught upon the members, m, m', of the screen, L, which members operate to deliver the grain to the trough, b, while the foul seeds escape through the openings of said screen into the casing, B, from whence they may be discharged in a suitable way. The straw and chaff are exhausted from the cylinder by the suction of the fan, C, while the tailings escape through the slots k, and are caught in the trough, b', while the straw and chaff are blown out of the machine. As shown, a suitable pneumatic stacker tube can be employed in connection with the exhaust fan C, for carrying away the straw and chaff. The grain in the trough, b, is discharged by the wings, n, through the spout, N, whereas the tailings are expelled from the trough, b', by the wings, O', which elevate the tailings into the spout, O, the latter discharging said tailings upon the elevator, P, which returns them to the threshing mechanism.

In connection with the threshing mechanism, H, H', and the imperforate front part of the rotatable cylinder, there is employed a hood, Q, see Fig. 1, adapted to direct the straw and threshed grain downwardly into the cylinder and into the path of the blast from the fan, I.

Having thus fully described the invention, what I claim as new, and desire to secure by Letters Patent is:

1. In a machine of the class described, the combination of an external casing, a screen cylinder having an imperforate front portion, threshing mechanism adjacent to said imperforate front portion of the screen cylinder, a blast fan for supplying air directly to the front part of said screen cylinder, means for bodily rotating said screen cylinder, a suction fan in coöperative relation to the rear portion of the screen cylinder, the axis of rotation of the suction fan being substantially coincident with the axis of rotation of the screen cylinder, and internal agitator devices secured to and rotating with the screen cylinder, said agitator devices being provided on the perforated part of the screen cylinder between the blast fan and the suction fan, whereby said agitator devices maintain the threshed grain in a loose open condition for the circulation of air currents established by the blast and suction fans.

2. In a grain separator, a casing, a tailings trough adjacent to the rear part of said casing, a rotatable screen within said casing, said screen having openings in the plane of the tailings trough for the exit of tailings to said trough, means operated by the screen and working in said trough for elevating the tailings, an elevator for receiving the tailings from said trough, and a suction fan in coöperative relation to the rear end of said screen for exhausting air therefrom.

3. In a threshing machine, a main casing provided with a tailings trough, a hood at the rear part of said casing, a screen cylinder extending lengthwise of said casing and into said hood, the rear part of said screen cylinder having slots in the vertical plane of the tailings trough, means for rotating the screen cylinder, threshing mechanism adapted to supply grain to the front part of the screen cylinder, and means whereby air is caused to circulate through the screen cylinder.

4. In a machine of the class described, an external stationary casing, a revoluble perforated cylinder within said casing, said cylinder having near the rear part thereof, radial slots for the escape of tailings therefrom, threshing mechanism adjacent to a front part of said cylinder, exhaust mechanism adjacent to the rear part of said cylinder, and a tailings trough incasing the rear part of the slotted cylinder.

5. In a machine of the class described, a stationary casing, a revoluble perforated cylinder operating therein, means for rotating said cylinder and a conical perforated screen intermediate the cylinder and the casing.

6. In a machine of the class described, a stationary casing provided with an annular grain trough, a cylinder revoluble within said casing, means for discharging the grain, and means rotatable with the cylinder and operating in the trough for elevating the grain to the discharging means.

7. In a machine of the class described, a stationary casing provided with an annular grain trough, a cylinder revoluble within said casing, a grain spout extending from said trough, and wings carried by the cylinder and sweeping in the trough for raising the grain therein to the grain spout.

8. In a machine of the class described, a stationary casing provided with an annular grain trough, a perforated cylinder revoluble within said casing, and conical screens inclined toward said trough of the casing.

9. In a machine of the class described, a stationary casing provided with an annular grain trough, a perforated cylinder revoluble within said casing, and conical screens inclined toward said trough of the casing, said screens being externally of the cylinder and attached to the same for rotation therewith.

10. In a machine of the class described, a stationary casing provided at its rear part with a tailings trough, a revoluble perforated screen, threshing mechanism coöperating with the front end of said screen, means for rotating said screen, a tailings elevator, and wings rotating with the cylinder and operating in said trough for discharging the contents of said trough into said elevator.

11. In a machine of the class described, a stationary casing provided at its rear part with an annular tailings trough, threshing mechanism, a tailings elevator discharging to said threshing mechanism, a revoluble cylinder, wings revoluble with said cylinder and operating in said trough, and a spout connected to the trough and discharging tailings therefrom into said elevator.

12. In a machine of the class described, a revoluble perforated cylinder provided near its rear end with radial exit slots and a casing having an annular trough opposite to said slotted part of the cylinder.

In testimony whereof I have signed my name to this specification in the presence of two subscribing witnesses.

WILLIAM A. BREWSTER.

Witnesses:
 A. IRVINE,
 JACK ALEXANDER.